United States Patent
Stefanov et al.

(10) Patent No.: US 9,982,862 B2
(45) Date of Patent: May 29, 2018

(54) LIGHT GUIDING ELEMENT AND LIGHT MODULE

(71) Applicant: Automotive Lighting Reutlingen GmbH, Reutlingen (DE)

(72) Inventors: Emil P. Stefanov, Reutlingen (DE); Christian Buchberger, Reutlingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 407 days.

(21) Appl. No.: 14/415,835

(22) PCT Filed: Jul. 24, 2013

(86) PCT No.: PCT/EP2013/065611
§ 371 (c)(1),
(2) Date: Jan. 20, 2015

(87) PCT Pub. No.: WO2014/019912
PCT Pub. Date: Feb. 6, 2014

(65) Prior Publication Data
US 2015/0167913 A1    Jun. 18, 2015

(30) Foreign Application Priority Data
Aug. 3, 2012 (DE) .......... 10 2012 213 845

(51) Int. Cl.
*F21S 8/10* (2006.01)
*F21V 8/00* (2006.01)
(Continued)

(52) U.S. Cl.
CPC ......... *F21S 48/1241* (2013.01); *F21S 41/143* (2018.01); *F21S 41/20* (2018.01);
(Continued)

(58) Field of Classification Search
CPC .. F21S 48/115; F21S 48/1154; F21S 48/1241; F21S 48/125; F21S 48/2225;
(Continued)

(56) References Cited

U.S. PATENT DOCUMENTS 7,286,296 B2 * 10/2007 Chaves ............... F21S 48/1241
257/E33.071
7,581,860 B2 * 9/2009 Bogner .................... B60Q 1/04
362/244
(Continued)

FOREIGN PATENT DOCUMENTS

DE          10252228 A1    8/2003
DE    102006044641 A1    3/2008
(Continued)

OTHER PUBLICATIONS

Feb. 26, 2013 German Examination Report for German Patent Application No. 10 2012 213 845.5.
(Continued)

*Primary Examiner* — Jong-Suk (James) Lee
*Assistant Examiner* — Colin Cattanach
(74) *Attorney, Agent, or Firm* — Howard & Howard Attorneys PLLC

(57) ABSTRACT

Light guiding elements having a light guiding section extending between a light entrance surface for coupling in light and a light exit surface for coupling out light from the light guiding element through the light exit surface. The light exit surface extends along an exit surface longitudinal direction. The light guiding section has at least a first and a second lateral surface extending from the light entrance surface to the light exit surface such that light can be guided by total internal reflection from the light entrance surface to the light exit surface. The form of the light entrance surface differs from that of the light exit surface. The light guiding
(Continued)

section has a roof section extending toward the light exit surface in which the first and the second lateral surfaces taper toward each other with respect to the exit surface longitudinal direction.

8 Claims, 11 Drawing Sheets

(51) Int. Cl.
  *F21Y 105/12* (2016.01)
  *F21Y 105/10* (2016.01)
(52) U.S. Cl.
  CPC ............. *F21S 41/24* (2018.01); *F21S 41/285* (2018.01); *F21S 41/663* (2018.01); *G02B 6/0008* (2013.01); *F21S 43/20* (2018.01); *F21S 43/235* (2018.01); *F21S 43/236* (2018.01); *F21S 43/237* (2018.01); *F21W 2102/00* (2018.01); *F21Y 2105/10* (2016.08); *F21Y 2105/12* (2016.08)
(58) Field of Classification Search
  CPC ............... F21S 48/2231; F21S 48/2237; F21S 48/2243; F21S 48/225; F21S 48/2256; F21S 48/2262; F21S 48/2268; F21S 48/2275; F21S 48/2281; F21S 48/2287; F21S 48/2293; F21S 41/20; F21S 41/24; F21S 41/285; F21S 43/20; F21S 43/235; F21S 43/236; F21S 43/237; F21S 43/241; F21S 43/247; F21S 43/249; F21S 43/251; F21S 43/26; G02B 6/0008; G02B 6/0005; F21V 2200/10; F21V 2200/13; F21V 2200/15; F21W 2101/10; B60Q 1/0011; B60Q 3/62; B60Q 3/64; B60Q 3/66
  See application file for complete search history.

(56) References Cited

U.S. PATENT DOCUMENTS

| | | | | |
|---|---|---|---|---|
| 7,683,395 B2* | 3/2010 | Huber | ................. | F21S 48/1154 257/99 |
| 2006/0083013 A1* | 4/2006 | Wanninger | ........... | F21S 48/1154 362/509 |
| 2007/0008734 A1* | 1/2007 | Bogner | ................... | B60Q 1/04 362/509 |
| 2007/0024971 A1* | 2/2007 | Cassarly | ............. | G02B 6/0008 359/485.03 |
| 2007/0126994 A1* | 6/2007 | Hwang | ................ | G02B 6/0046 353/94 |
| 2008/0030691 A1* | 2/2008 | Godo | ..................... | G02B 27/09 353/98 |
| 2008/0080201 A1* | 4/2008 | Specht | ................. | F21S 48/1154 362/507 |
| 2008/0198574 A1* | 8/2008 | Woodward | ........... | F21S 48/1154 362/85 |
| 2008/0253144 A1* | 10/2008 | Dolson | ................ | B60Q 1/0041 362/547 |
| 2008/0285310 A1* | 11/2008 | Aylward | ................ | G02B 6/001 362/626 |
| 2008/0316759 A1* | 12/2008 | Valcamp | ............. | B60Q 1/0011 362/507 |
| 2009/0016074 A1* | 1/2009 | Dolson | ..................... | F21K 9/00 362/555 |
| 2009/0034278 A1* | 2/2009 | Tessnow | .............. | F21S 48/1154 362/511 |
| 2010/0246200 A1* | 9/2010 | Tessnow | ............. | F21S 48/2237 362/509 |
| 2011/0080744 A1* | 4/2011 | Woodward | ............. | F21S 48/115 362/317 |
| 2012/0014127 A1* | 1/2012 | Kanade | ................ | G02B 6/0045 362/558 |

FOREIGN PATENT DOCUMENTS

| | | | | |
|---|---|---|---|---|
| DE | 102009053581 B3 * | 3/2011 | .......... | F21S 48/1154 |
| DE | 102010023360 A1 | 4/2011 | | |
| DE | 102011077636 A1 * | 11/2011 | .......... | B60Q 1/1423 |
| DE | 102010046021 A1 | 3/2012 | | |
| EP | 1903274 A1 | 3/2008 | | |
| EP | 2280215 A2 * | 2/2011 | .............. | B60Q 1/04 |
| JP | 2006521667 A | 9/2006 | | |
| JP | WO 2007080772 A1 * | 7/2007 | .......... | G02B 6/0018 |
| WO | 2004088200 A2 | 10/2004 | | |
| WO | WO 2012005686 A1 * | 1/2012 | .......... | G02B 6/0046 |
| WO | WO 2012083957 A1 * | 6/2012 | .......... | G02B 6/0008 |

OTHER PUBLICATIONS

Oct. 16, 2013 Written Opinion for PCT/EP2013/065611.
Notice of Reasons for Rejection issued by the Japanese Patent Office in Japanese Patent Application No. 2015-524724 dated Jun. 6, 2017 (10 pages).
Notice of Reasons for Rejection issued by the Japanese Patent Office in Japanese Patent Application No. 2015-524724 dated Jan. 23, 2018.

* cited by examiner

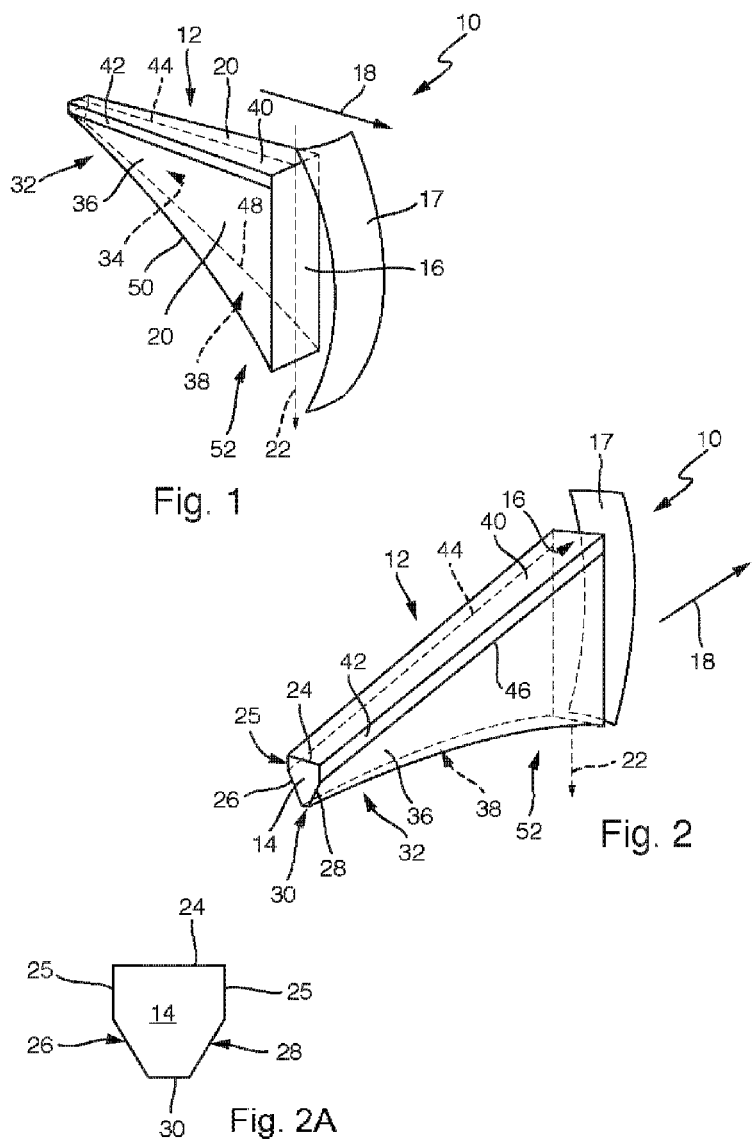

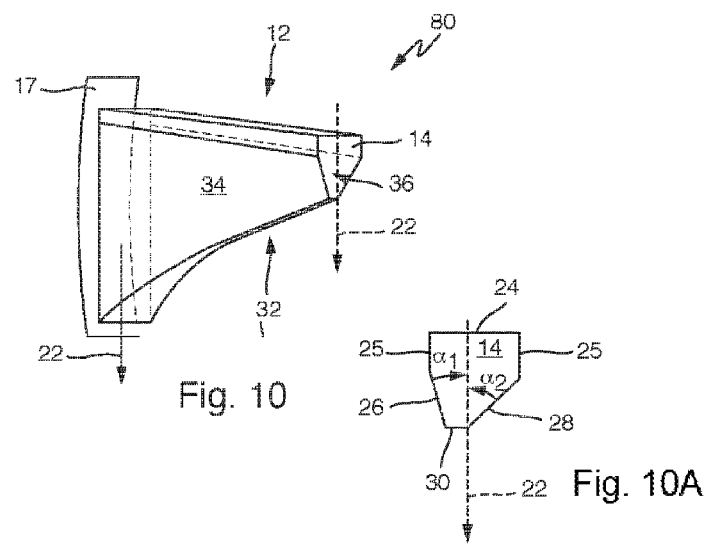
Fig. 10
Fig. 10A
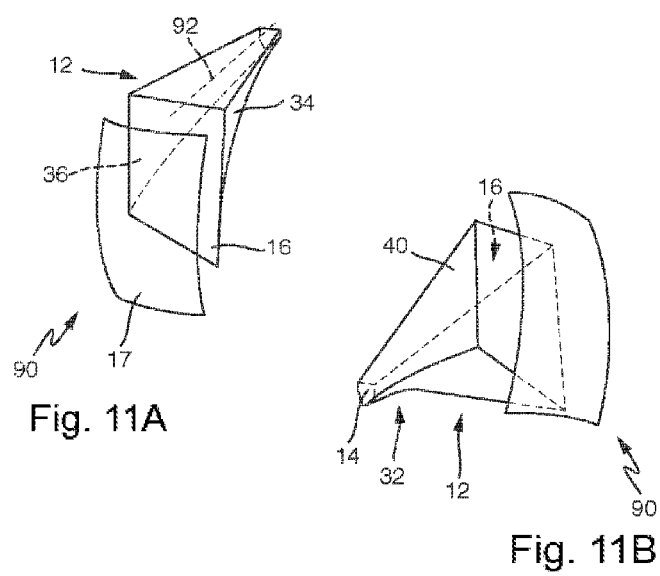
Fig. 11A
Fig. 11B

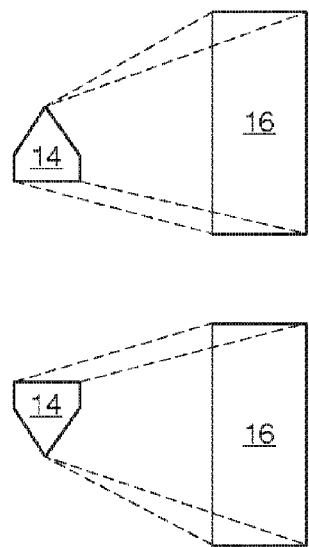
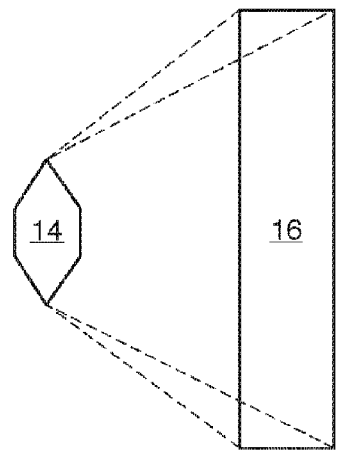
Fig. 16    Fig. 17
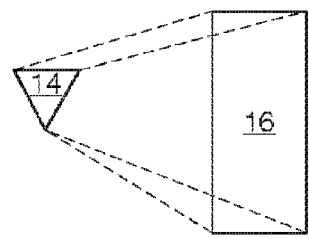
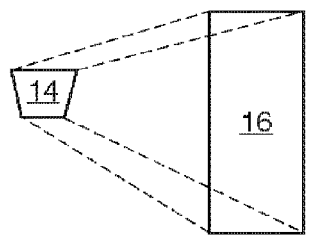
Fig. 18    Fig. 19

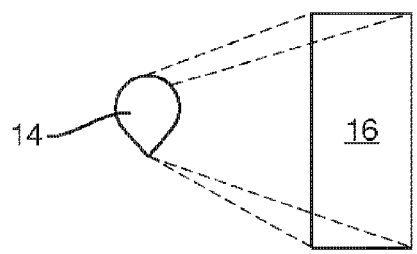
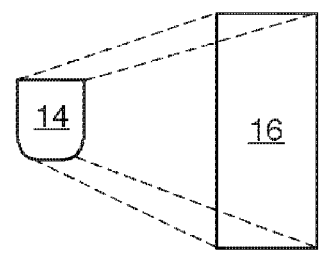
Fig. 29  Fig. 30
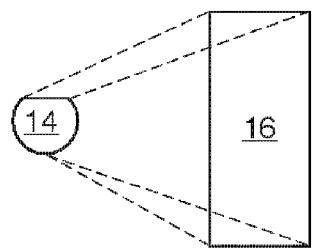
Fig. 31

LIGHT GUIDING ELEMENT AND LIGHT MODULE

CROSS-REFERENCE TO RELATED APPLICATION

This application is based upon and claims priority to PCT Application No. PCT/EP2013/065611 filed on July 24, Aug. 3, 2012.

BACKGROUND OF THE INVENTION

1. Field of the Invention

The present invention relates, generally, to motor vehicle lighting devices and, more specifically, to a light guiding element and light module for motor vehicle lighting devices.

2. Description of the Related Art

Motor vehicle head lights known in the related art may include a matrix-like arrangement of semiconductor light sources, a primary optics, and a secondary optics. The primary optics includes light guiding elements are arranged in a matrix-like way, are aligned towards the respective light sources, and feature a respective light entrance surface and a light exit surface. The light exit surfaces of the light guiding elements are arranged in a matrix-like way and thus form a primary optics exit surface. The secondary optics is arranged in such a way that the resulting intensity distribution of the light on this primary optics exit surface is projected onto an area in front of the head light, in order to accomplish a desired distribution of the emitted light.

With these arrangements, it is possible to use a number of semiconductor light sources for light production. Moreover, high intensities can be accomplished in this way. It is further possible to realize a dynamic distribution of the emitted light. In order to accomplish this, it is known in the art that selected individual semiconductor light sources are deactivated during the operation of the remaining light source. In this way, for example, it is possible to produce a partial high beam light or a high beam light strip, which has a light distribution by which it is possible to avoid an undesired blinding of the oncoming traffic. Those semiconductor light sources will be specifically deactivated, where light would be deflected via the primary optics and the secondary optics into an area which would be blinding oncoming traffic.

In the motor vehicle sector, the distribution of the light emission should feature a certain intensity curve, which is predetermined by government regulations. A low beam light distribution, for example, has a basically horizontal cut-off line. It may be positioned higher on the side that is facing away from the oncoming traffic than on the side that is facing towards the oncoming traffic (so-called "z-shape"). In this way, a blinding of the oncoming traffic is avoided, while at the same time illuminating the side that is facing away from the oncoming traffic to a comparatively farther distance. In contrast, a high beam light distribution should generally feature an intensively illuminated area above the cut-off line.

Thus, in order to keep the construction of a motor vehicle head light compact and simple, it is desired to produce a desired light distribution already via the primary optics of the head light. Published German Patent No. DE 10 2009 053 581 B3 describes a primary optics with a number of light guiding elements that are arranged in a matrix-like way. The respective light guiding elements feature a basically square light entrance surface and a basically rectangular light exit surface. A light guiding section extends between the light entrance surface and the light exit surface, which includes surfaces that are designed for guiding light via total internal reflection. In their course from the light entrance surface towards the light exit surface, the lateral surfaces widen out in a funnel-shaped or conical manner. With a suitable concave curvature of the lateral surfaces of the light guiding section, it is possible to pre-set an intensity curve of the guided light on the light exit surface to a certain degree, since the light rays are given a direction component via the total internal reflection on the curvature of the lateral surfaces which is opposite to the direction of the curvature of the lateral surfaces.

However, with the given expansion of the light guiding element in the direction from the light entrance surface towards the light exit surface, it is only possible to enlarge the light exit surface to a certain limited extent. Due to the expansion of the cross section of the light guiding section from the light entrance surface towards the light exit surface, the enlarging of the light exit surface also means that the proportion of the light which will not be totally reflected at the bordering lateral surfaces of the light guiding section is increased as well. These light rays, which reach directly from the light entrance surface to the light exit surface, produce a box-shaped intensity profile or a step within the intensity profile of the light on the light exit surface. In order to avoid this effect when enlarging the light exit surface, it would be necessary to also extend the dimensions of the light guiding section between the light entrance surface and the light exit surface, in order to increase the proportion of the light rays that will be reflected on the lateral surfaces.

SUMMARY THE INVENTION

The present invention has the objective to provide a constantly modulated light distribution for motor vehicle head lights via one primary optics and to accomplish a compact construction. The present invention overcomes the disadvantages in the related art in a light guiding element for motor vehicle lighting devices having a light guiding section which is extending between a light entrance surface for coupling-in light and a light exit surface for coupling-out light from the light guiding element through the light exit surface. The light exit surface is designed as a surface that extends alongside a longitudinal direction of the exit surface (the direction along which the light exit surface is extending in longitudinal direction), and the light guiding section has at least a first and a second lateral surface extending in the direction from the light entrance surface towards the light exit surface in such a way that light can be guided by total internal reflection from the light entrance surface towards the light exit surface. The light entrance surface and the light exit surface are different in shape, whereby the light guiding section that is extending right from the light entrance surface towards the light exit surface is featuring a roof section. In the area of the roof section, the first lateral surface and the second lateral surface run towards each other with reference to the longitudinal direction of the exit surface.

The light guiding section extends between the light entrance surface and the light exit surface basically within one main light guiding direction, in which light can be guided along the lateral surfaces of the light guiding section via total internal reflection. A total internal reflection occurs when a light ray, which impacts on a lateral surface, is forming an angle towards the perpendicular of the lateral surface at the reflection point, which is larger than the critical angle of the total internal reflection, so that the law of refraction (Snell's law) does not produce a real solution for the reflection angle.

The first and the second lateral surface form light guiding surfaces which are inclined towards each other. These basically extend along the main light guiding direction between the light entrance surface and the light exit surface as well. In relation to this direction, the first and the second lateral surface basically run parallel. They can also diverge in this direction. In contrast to this, the first and the second lateral surface are inclined towards the longitudinal direction of the exit surface, which means that they are arranged towards each other in a roof-shaped manner. At least for a certain part, the first and the second lateral surface are designed in an even manner. The even surfaces then extend into the direction from the light entrance surface towards the light exit surface and run towards each other in a roof-shaped manner with reference to the longitudinal direction of the exit surface (which means basically vertical to the main light guiding direction).

The light entrance surface and the light exit surface are different in shape in that they do not originate from one another by compression, stretching, rotation, distortion, shearing or similar images. Due to the different shape, it is possible that the light guiding section can form a roof section in its course from the light entrance surface towards the light exit surface. For this purpose, the light entrance surface in general may include, for example, a first pointed edge and a second pointed edge, which join each other in an acute angle. The first or the second lateral surface of the roof section extend from these two pointed edges so that the first and the second lateral surface include the roof-shaped course, as noted above. The cross section of the light guiding section merges from the light entrance surface into the differently shaped light exit surface in a particularly continual way.

The roof-shaped spine, which is formed by the first and the second lateral surface and which extends from the light entrance surface into the direction of the light exit surface, allows for an advantageous influencing of the intensity profile which appears on the light exit surface, when light is coupled into the light entrance surface. When reflected on the lateral surfaces of the roof section, the guided light rays on the inside of the light guiding section are given a direction component, which is opposite to the direction in which the first and the second lateral surface are joining each other. Thus, a light beam that is basically moving forward within the light guiding section along the roof-shaped spine, that was formed by the first and the second lateral surface, is focused at each total internal reflection on the roof section in a direction that is opposite to that of the roof section. Overall, the light that is coupled-in through the light entrance surface is thus focused within a concentration area of the light exit surface, which is opposite to the direction in which the lateral surfaces of the roof section join each other. This defines a concentration direction on the light exit surface.

Since the roof-shaped lateral surfaces do not fully block off the course of the light from the light entrance surface towards the light exit surface, a certain proportion of the light will reach into the area of the light exit surface, which is situated opposite of the concentration area (referring to the area, which is situated in the direction, in which the roof-shaped sloped lateral surfaces join each other). Thus, it is significant for the invention, that the lateral surfaces of the light guiding section are formed in such a way, that a desired intensity profile can be produced on the light exit surface, in particular a variation of the light intensity on the light exit surface along the longitudinal direction of the exit surface. The light intensity continually decreases in the direction in which the lateral surfaces of the roof section join each other, for example similar to an exponential course. Opposite to this direction, an intensity maximum is produced in the concentration area of the light exit surface. The intensity profile on the light exit surface can be specifically influenced via the shaping of the lateral surfaces of the roof section.

In this light guiding element according to the invention, it is possible to form the light exit surface in an elongated shape with a large expansion of the longitudinal direction of the exit surface and thereby to produce a constant course of the intensity profile along the entire light exit surface. In contrast to the named prior art, it is not necessary to increase the longitudinal expansion of the light guiding section between the light entrance surface and the light exit surface as well. Even with a comparatively short longitudinal expansion, it is still possible, that the roof-shaped lateral surfaces of the roof section can influence the course of the light rays close to the center of the light guiding section. The problem of a step-like or box-shaped intensity curve discussed above can thus be avoided.

In order to improve the light emitting characteristics of the light guiding element, an exit optics can be attached to the light exit surface. This exit optics is positioned within the optical path downstream of the light exit surface, which means following the light exit surface in the main light guiding direction. It is hereby possible to provide a predefined distance between the light exit surface and the exit optics along the main light guiding direction. The exit optics has a particularly convex curvature (for example, lens-like or pillow-shaped exit optics surface) through which light can be emitted into the direction of a secondary optics. In this way, the exit optics surface forms the particular surface, through which light can exit out of the entire light guiding element. Thus, the light exit surface is the particular surface through which the light (which was guided through the light guiding section) exits out of the light guiding section.

In utilizing the exit optics and their arrangement in relation to the light exit surfaces, it is possible that the light rays which were guided within the light guiding section can be further focused after they exit through the light exit surface in the direction of the secondary optics. Furthermore, rays of stray light (where the angle towards the main light guiding direction is too large at their exit from the light exit surface) can be directed past the secondary optics. In this way it can be avoided, that the secondary optics can project the mentioned rays of stray light in an angle towards the main direction of the emitted light, which is too large and which could lead to an undesired, diffuse illumination of the blocked-out areas in a partial high beam light.

Advantageously, the bordering lateral surfaces of the light guiding section, in particular also the lateral surfaces of the roof section, diverge in the expansion direction of the light guiding section starting from the light entrance surface towards the light exit surface, so that the cross section of the light guiding section increases in the direction starting from the light entrance surface towards the light exit surface. The lateral surfaces diverge in a particularly conical or funnel-shaped manner. Thus, for example, the light entrance surface is designed smaller than the light exit surface. The diverging lateral surfaces produce the effect that the reflection angle at the lateral surfaces is decreasing in relation to the main light guiding direction with each total internal reflection. Thus, a diverging light beam that is coupled into the light entrance surface can be collimated with regards to the main light guiding direction.

If the lateral surfaces of the roof section diverge in the direction starting from the light entrance surface towards the light exit surface as well, then a decreasing proportion of the light rays also impacts on one of the roof-shaped lateral surfaces while the light beam is guided from the light entrance surface towards the light exit surface. Thus, it is possible to further influence the intensity profile on the light exit surface via an expansion of the lateral surfaces of the roof section in transverse direction (perpendicular to the longitudinal direction of the exit surface).

In addition to the lateral surfaces of the roof section, the light guiding section is advantageously confined by at least one more light guiding surface which extends in the direction from the light entrance surface towards the light exit surface and which is directly bordering to one of the lateral surfaces of the roof section at least for a certain distance. This additional light guiding surface constitutes a lateral surface according to the before mentioned kind, which means that it is designed to guide light via total internal reflection. This light guiding surface runs basically parallel to the longitudinal direction of the exit surface, which means that in contrast to the lateral surfaces of the roof section, the additional light guiding surface is not set in an inclined roof-shaped angle. Thus, when reflected at the light guiding surface, a light ray does not receive an additional direction component which is opposite to the direction, in which the lateral surfaces of the roof section join each other. By selecting the ratio between the size of the light guiding surface and of the lateral surfaces of the roof section, it is possible to influence the intensity profile on the light exit surface. The greater the proportion of the roof-shaped lateral surfaces, the more light will be directed into the concentration area on the light exit surface while light is guiding through the light guiding section.

If the roof section is assigned a certain roof height parallel to the longitudinal direction of the exit surface, and the additional light guiding surface is assigned a certain light guiding height parallel to the longitudinal direction of the exit surface, then the ratio between the roof height and the light guiding height determines the strength of the light concentration within the concentration area on the light exit surface. The greater the roof height in comparison to the light guiding height, the greater the proportion of the coupled in light into the light entrance surface, which will be directed into the concentration area of the light exit surface, which means that the curve of the intensity profile will be steeper with reference to the intensity maximum. The intensity curve can be further influenced by changing (for example, continually decreasing) the ratio of the roof height to the light guiding height along the course of the roof section from the light entrance surface towards the light exit surface.

The additional light guiding surface touches the roof section (for example, through a roof bordering edge) whereby the roof bordering edge runs in the direction starting from the light entrance surface towards the light exit surface. Moreover, the first and the second lateral surface of the roof section join each other in a roof ridge. This roof ridge of the roof section also runs in the direction starting from the light entrance surface to the light exit surface.

Further, it is also possible that the roof section could be designed in the shape of a roof with a flattened top. In this case, the light guiding section can be confined by a roof ridge surface in the direction along which the lateral surfaces of the roof section are running towards each other. This roof ridge surface runs between the first and the second lateral surface, directly bordering to both of them, and is designed in such a way that, when viewed in cross section parallel to the light exit surface, the light guiding section has a bordering edge, which is formed by the roof ridge surface, that is perpendicular to the longitudinal direction of the exit surface. Along the roof section, the roof ridge surface can run perpendicular to the longitudinal direction of the exit surface in some portions. The roof ridge surface also extends in the direction from the light entrance surface towards the light exit surface along the course of the light guiding section. The lateral surfaces of the roof section, which run towards each other, directly connect to the roof ridge surface, so that the roof ridge surface flattens the top of the roof that was formed by the lateral surfaces. Advantageously, the roof ridge surface borders the first lateral surface in a first roof ridge surface edge and the second lateral surface in a second roof ridge surface edge, whereby the first and the second roof ridge surface edge basically run in the direction from the light entrance surface towards the light exit surface and are parallel, for example. A non-parallel course is also possible.

The roof ridge surface has a certain lateral expansion perpendicular to its extension direction from the light entrance surface towards the light exit surface, which preferably increases in the course of the roof ridge surface from the light entrance surface towards the light exit surface. The lateral expansion refers to the width of the roof ridge surface perpendicular to the extension direction of the light guiding section and in particular also perpendicular to the longitudinal direction of the exit surface. The roof ridge surface expands in width throughout its course in the direction from the light entrance surface towards the light exit surface. The particularly constant increase of the lateral expansion can occur throughout the entire course of the roof ridge surface from the light entrance surface towards the light exit surface, or only within a portion of the roof section. Thus, the light guiding section is expanding in width throughout its course from the light entrance surface towards the light exit surface in a funnel-shaped manner with reference to a lateral direction perpendicular to the longitudinal direction of the exit surface.

The roof section does not necessarily extend all the way up to the light exit surface. Rather, it is possible that the light guiding section has an outlet section which is connected to the roof section, and which is confined by the lateral surfaces which run parallel with reference to their longitudinal direction of the exit surface. Thus, this outlet section is not designed in a roof-shape. The transition between the roof section and the outlet section can be accomplished in that the mentioned roof ridge surface is widening out to the extent, that its lateral expansion corresponds to the lateral expansion of the light exit surface, and that the outlet section is connecting to it.

For further development, it is possible that the roof ridge surface can curve in its course starting from the light entrance surface towards the light exit surface into the direction, in which the first and the second lateral surface join together. The roof ridge surface in particular curves in the longitudinal direction of the exit surface. In this way, the light guiding section is expanding in its course from the light entrance surface towards the light exit surface in a funnel-shaped manner, whereby this expansion occurs with regards to the longitudinal direction of the exit surface or with regards to the direction in which the lateral surfaces join each other in the roof-shaped way. The roof ridge surface, which is confining the light guiding section, may be curved in a concave way.

For certain applications, the roof section can be designed in a tilted way with regards to the longitudinal direction of the exit surface. To that end, the first lateral surface of the roof section may be set in an acute first approach angle and the second lateral surface set in a second acute approach angle to the longitudinal direction of the exit surface, whereby the first approach angle and the second approach angle differ in size. During propagation through this roof section, light beams receive an effective direction component into the direction of the lateral surface, which has the larger angle to the longitudinal direction of the exit surface. Thus, the light focus on the light exit surface is moved in transverse direction to the longitudinal direction of the exit surface. This effect can be advantageous in order to compensate the displacement of components towards each other in the construction of a complex head light arrangement. It is further possible to present a light distribution with a laterally displaced light focus (for example, in order to achieve a dimmed-out light distribution).

It can also be advantageous if the light guiding section in its course from the light entrance surface towards the light exit surface extends along a curved or arched guiding line, whereby the roof section and/or at least one of the lateral surfaces of the light guiding section follows the course of the guiding line. In this way, the intensity curve on the light exit surface can be particularly modified. It is thus possible to produce a tilted cut-off line or a tilted intensity maximum on the light exit surface.

In order to confine the light guiding section on the side opposite of the roof section with reference to the main light guiding direction from the light entrance surface towards the light exit surface, it is possible to design a plane opposite of the roof section. This plane opposite of the roof section extends between the light entrance surface and the light exit surface and is basically designed as an even plane. In the direction towards the plane opposite of the roof section, the lateral surfaces of the roof section diverge. The plane opposite of the roof section also forms a lateral surface as noted above, which means that it is designed to guide light via total internal reflection. In the forward movement throughout the light guiding section, light rays that are totally reflected on the lateral surfaces of the roof section thus receive a direction component into the direction of the plane opposite of the roof section. Thus, a light concentration appears in the area on the light exit surface in which the plane opposite of the roof section joins together with the light exit surface. The concentration area of the light exit surface in particular directly connects to the edge of the light exit surface in which the plane opposite of the roof section joins together with the light exit surface.

Instead of the plane opposite of the roof section, it is possible that the light guiding section has a further roof section in addition to the (first) roof section noted above (called the 'opposite roof section' in the following). This opposite roof section confines the light guiding section in the direction opposite of the roof section with reference to the extension direction between the light entrance surface and the light exit surface. The light guiding section thus has a roof section and an opposite roof section, which both extend in the direction from the light entrance surface towards the light exit surface and which lie opposite of each other with reference to the course of the light guiding section from the light entrance surface towards the light exit surface. The opposite roof section also has two lateral surfaces (for example, a third and a fourth lateral surface) which run towards each other with regard to the longitudinal direction of the exit surface, but in opposite direction to the one, in which the first and the second lateral surface of the beforementioned roof section run towards each other.

A roof section may be obtained in that the light entrance surface and the light exit surface are formed as a respective polygon, whereby the number of corners of the light entrance surface differs from the number of corners of the light exit surface. It is possible that there is a lower number of corners for the light entrance surface (for example, a triangular light entrance surface) which is connected to a rectangular light exit surface via the light guiding section. Moreover, it is also possible that the light entrance surface has a larger number of corners, compared to that of the light exit surface (for example, a hexagonally arranged light entrance surface which merges into a rectangular light exit surface via the light guiding section). Further, the light entrance surface and the light exit surface may include a corresponding number of corners (for example, the light entrance surface can be arranged as a tetragon, which include one corner with an acute edge angle, whereas the light exit surface is rectangular).

Importantly, the light exit surface can be shaped in an elongated way. Thus, the light exit surface has a longitudinal expansion in longitudinal direction of the exit surface and a transverse expansion perpendicular to the longitudinal direction of the exit surface, whereby the longitudinal expansion is larger than the transverse expansion. The longitudinal expansion in particular can be double or more than double the size of the transverse expansion. It is also possible that the light exit surface is elongated in a strip-like manner. It is advantageous for the embodiment of the light exit surface to be rectangular with two parallel long sides that are oriented along the longitudinal direction of the exit surface and perpendicular to that with two parallel transverse sides, whereby the long sides are longer than the transverse sides. In particular, the side ratio (length of the long sides to length of the transverse sides) is greater than 2:1. With the light guiding element according to the invention, it is possible to produce a continual intensity profile on such an elongated light exit surface along the entire longitudinal extension. It is for example possible to produce a cut-off line (intensity maximum) that is running along a narrow transverse side of the light exit surface, with a continual fading-out in the direction of the opposite narrow transverse side, in the direction in which the lateral surfaces of the roof section run towards each other. In contrast to the known light guiding elements, it is not necessary to enlarge the expansion of the light guiding element along its course from the light entrance surface towards the light exit surface, when the light exit surface is enlarged in the longitudinal direction of the exit surface. The earlier-mentioned problem of a box-shaped or step-like light profile can be avoided.

The present invention also overcomes the disadvantages in the prior art in a light module for motor vehicle head lights comprising a matrix-like arrangement of semiconductor light sources for emitting light. A primary optics includes light guiding elements arranged in a matrix-like way which feature a respective light entrance surface and a light exit surface, whereby one respective light entrance surface is assigned to one of the semiconductor light sources, and the light exit surfaces of the light guiding elements are arranged in a matrix-like way and form a primary optics exit surface. A secondary optics is arranged in such a way that the light distribution produced by the light module and which appears on this primary optics exit surface is projected onto an area in front of the head light or of the light module in order to accomplish a desired distribution of the emitted light. Here, all or individual light modules intended for a light module for motor vehicle head lights with these characteristics are designed as discussed above. In the light module, the individual semiconductor light sources that are arranged in a matrix-like way, can preferably be activated or turned on or off independent from each other. In this way it, is possible to accomplish a dynamic distribution of the emitted light (for example, a high beam light strip as noted above).

Due to the described design of the light guiding elements, it is possible that each light exit surface of a light guiding element that is contributing to the primary optics exit surface can produce a light distribution which has a desired intensity curve. Thus, a cut-off line can already be produced on the primary optics exit surface, which has a continual intensity fading-out along the longitudinal direction of the exit surfaces of the individual light exit surfaces.

In the light module, one respective light entrance surface is assigned to one of the semiconductor light sources. The light emitted from the respective semiconductor light source can be coupled into the respective light guiding element through the light entrance surface. Since the semiconductor light source generally emits a divergent light (for example, as in the case of light emitting diodes), the coupling-in is more effective the closer the respective semiconductor light source with its light emitting surface is arranged to the light entrance surface which is arranged towards the light.

The light module can be improved in that the semiconductor light source includes a light emitting surface for emitting light, whereby this light emitting surface is different in its shape from the respectively assigned light entrance surface of the light guiding element of the primary optics. The light emitting surface and the light entrance surface are different in shape in that they cannot be mutually converted via compression, stretching, rotation, distortion, or shearing. For example, it is thus possible that a square light emitting surface of an LED could be assigned to a basically triangular coupling-in surface. Thus, for calibration it is not necessary that all corners of the light emitting surface and of the light entrance surface have to be aligned to each other. An inaccuracy in the positioning of the semiconductor light source in relation to the light entrance surface merely has the effect that the light emitting surface overlaps the light entrance surface of the light guiding element with one of its corners. In this way, only a small portion of the emitted intensity is lost. The difference in shape discussed above thus lowers the demand for precision that is needed for the calibration of the semiconductor light source in relation to the primary optics in the construction of the light module. It is therefore possible to reduce tolerance distances. In this way, a more compact and more efficient light module can be constructed.

BRIEF DESCRIPTION OF THE DRAWINGS

Other objects, features, and advantages of the present invention will be readily appreciated as the same becomes better understood after reading the subsequent description taken in connection with the accompanying drawing wherein:

FIG. 1 shows a light guiding element according to the invention in an oblique view onto the light exit surface.

FIG. 2 shows the light guiding element of FIG. 1 in an oblique view onto the light entrance surface.

FIG. 2A shows the light entrance surface of FIG. 2.

FIG. 10 shows another further embodiment of a light guiding element.

FIG. 10A shows a sketch of the light entrance surface of FIG. 10.

FIG. 11A shows a further embodiment of a light guiding element according to the invention in a frontal view.

FIG. 11B shows the light guiding element of FIG. 11A in a rear view.

FIGS. 16-31 show sketches of form combinations.

DETAILED DESCRIPTION OF THE INVENTION

Figures 3A, 3B:
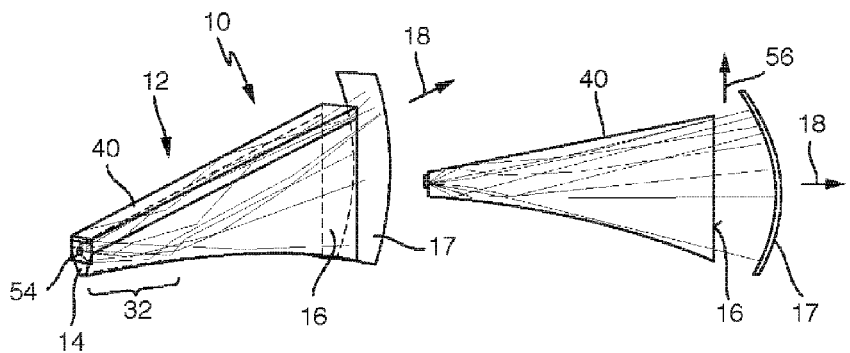
FIGS. 3A-3B show illustrative sketches to describe the optical path within the light guiding element of FIGS. 1-2.

In the following descriptions, like reference signs are used for corresponding or conforming characteristics. With reference now to the drawings, FIGS. 1 and 2 depict views of the light guiding element 10 with a light guiding section 12, which basically extends along a main light guiding direction 18 between a light entrance surface 14 and a light exit surface 16. Light guiding section 12 is formed in one single piece out of a transparent plastic material; for example, polymethyl methacrylate (PMMA), polycarbonate (PC), or silicone; and includes the surfaces 14 and 16 as bordering surfaces.

Light can be coupled into light guiding section 12 through light entrance surface 14. Further, light guiding section 12 is confined by the lateral surfaces 20, which extend between light entrance surface 14 and light exit surface 16, so that the coupled-in light can be guided within light guiding section 12 along the lateral surfaces 20 from light entrance surface 14 towards light exit surface 16 via total internal reflection.

Downstream in the optical path, an exit optics surface 17 of the sketched exit optics of the light guiding element 10 is positioned after light exit surface 16. This exit optics 17 is shaped in a pillow-like convex manner, facing away from light exit surface 16. In this way it is possible to focus light rays, which were guided within light guiding section 12, after their exit through light exit surface 16 into the direction of a secondary optics (compare FIG. 14), and to direct rays of stray light, where the angle towards the main light guiding direction 18 is too large at their exit from light exit surface 16, past the secondary optics. Thus, it is possible to avoid an undesired diffuse illumination of the dark areas in the blocked-out light distribution.

Light exit surface 16 basically has the shape of a rectangle, wherein the long sides extend along a 'longitudinal direction of the exit surface' 22. The dimensions of light exit surface 16 perpendicular to the 'longitudinal direction of the exit surface' 22 are less than half of the size of the dimensions alongside the 'longitudinal direction of the exit surface' 22. Thus, light exit surface 16 is formed in the shape of a rectangular strip.

Light entrance surface 14 is designed as an irregular hexagon and includes a base edge 24 which basically runs perpendicular to the 'longitudinal direction of the exit surface' 22. Connecting to this base edge 24, light entrance surface 14 has two leading edges 25 which run parallel to the 'longitudinal direction of the exit surface' 22. A first pointed edge 26 is connecting to one of the leading edges 25. Similarly, a second pointed edge 28 is connecting to the other leading edge 25. The first pointed edge 26 and the second pointed edge 28 are positioned in such an inclined way towards each other so as to point towards each other in regard to the 'longitudinal direction of the exit surface' 22 and thus form a respective acute approach angle to the 'longitudinal direction of the exit surface' 22. In the depicted example, the first pointed edge 26 and the second pointed edge 28 do not meet in a corner; rather, light entrance surface 14 is confined on the opposite side of base edge 24 by a bordering edge 30 which runs perpendicular to the 'longitudinal direction of the exit surface' 22. For the purpose of clarity, FIG. 2A depicts a sketch of light entrance surface 14 with its bordering edges.

In its course starting directly from light entrance surface 14, light guiding section 12 has a roof section 32. Starting from the first pointed edge 26 of light entrance surface 14, the first lateral surface 34 of light guiding section 12 extends in the direction towards light exit surface 16. Similarly, a second lateral surface 36 extends from the second pointed edge 28. Since the pointed edges 26 and 28 are pointing towards each other with regards to the 'longitudinal direction of the exit surface' 22, the first and the second lateral surface 34 and 36 also point towards each other with regards to the 'longitudinal direction of the exit surface' 22 in the area of roof section 32. They thus form a roof-shaped spine within the area of roof section 32, which extends from light entrance surface 14 into the direction of light exit surface 16. In the depictions according to FIGS. 1 and 2, this roof-shaped spine points vertically downward. Thus, in the present context, a roof-shaped formation is not limited to the generally common orientation (roof ridge pointing upward).

Starting from the lower bordering edge 30 of the light entrance surface, a roof ridge surface 38 extends into the direction of light exit surface 16. In the area of roof section 32, the first lateral surface 34 runs (at least to a certain extent) within a first plane and the second lateral surface 36 runs (at least to a certain extent) within a second plane. This first and second plane intersect along an imaginary intersecting line, which extends from light entrance surface 14 into the direction of light exit surface 16. On the side opposite of roof section 32, light guiding section 12 is confined by a 'plane opposite of the roof section' 40, which extends in an even manner, starting from the base edge 24 of light entrance surface 14 towards a transverse side of the rectangular light exit surface 16. In the depicted example, the 'plane opposite of the roof section' 40 basically extends perpendicular to the 'longitudinal direction of the exit surface' 22. However, other embodiments are also possible in which the plane opposite of the roof section forms an acute angle or an obtuse angle to the 'longitudinal direction of the exit surface' 22.

Extending from the leading edges 25, the respective light guiding surfaces 42 are basically aligned parallel to the 'longitudinal direction of the exit surface' 22. The extending light guiding surfaces 42 directly border to the first or the second lateral surface 34. Thus, one of the light guiding surfaces 42 borders on the first lateral surface 34 at roof bordering edge 44. Similarly, light guiding surface 42 borders on the second lateral surface 36 at roof bordering edge 46.

The first lateral surface 34 or the second lateral surface 36 connect to roof ridge surface 38 via a first 'roof ridge surface edge' 48 or via a second 'roof ridge surface edge' 50. The 'roof ridge surface edges' 48 and 50 extend from the particular corners of the light entrance surface 14, in which the first or second pointed edge 26 or 28 connect to bordering edge 30. The roof bordering edges 44 and 46 extend from the corners, in which the leading edges 25 connect to the first or second pointed edges 26 and 28.

The first lateral surface 34 and the second lateral surface 36 diverge with reference to the expansion direction of the light guiding section 12 from light entrance surface 14 towards light exit surface 16 in a funnel-shaped manner. Furthermore, within the area that is connecting to the roof-shaped section 32, roof ridge surface 38 curves into 'longitudinal direction of the exit surface' 22, so that light guiding section 12 has a concave shape in the area of roof ridge surface 38. Altogether, the cross section of light guiding section 12 is thus continually expanding, starting from light entrance surface 14 towards light exit surface 16.

Roof ridge surface 38 has a certain lateral expansion perpendicular to the 'longitudinal direction of the exit surface' 22. In the course of roof ridge surface 38, from bordering edge 30 towards the lower transverse edge of light exit surface 16, the lateral expansion of roof ridge surface 38 is continually increasing; however, the increase is not linear. The lateral expansion increases particularly rapid in the area of light guiding section 12, which connects to roof section 32 in its course from light entrance surface 14 towards light exit surface 16. This has the effect, that in the section that is directly connecting to light exit surface 16, light guiding surface 12 no longer has a roof-shape. Rather, light guiding section 12 has an outlet section 52 in the area of the light exit surface, wherein the first lateral surface 34 and the second lateral surface 36 are basically aligned parallel to the 'longitudinal direction of the exit surface' 22. Outlet section 52 thus connects to the roof section 32 along the direction from light entrance surface 14 towards light exit surface 16, whereby the transition from roof section 32 into outlet section 52 is continual.

The light guiding element 10 depicted in the FIGS. 1 and 2, is arranged mirror symmetrical to a mirror plane, which is spanned by the 'longitudinal direction of the exit surface' 22 and the main light guiding direction 18. By way of illustration, the optical path of some light rays coming from an indicated semiconductor light source 54 is sketched in FIGS. 3A-3B. All light rays within light guiding section 12 are mainly guided along light guiding direction 18 via total internal reflection. When reflected at the roof-shaped lateral surfaces 34 and 36 of roof section 32, the light rays receive a further direction component into the direction of the 'plane opposite of the roof section' 40. In this way, a large portion of the light rays that are guided within light guiding section 12 are directed into the direction of the particular bordering edge of light exit surface 16, in which the 'plane opposite of the roof section' 40 and light exit surface 16 join together. Thus, connecting to this mentioned bordering edge, a concentration area for the light intensity is formed on the light exit surface 16. Light is concentrated on light exit surface 16 opposite to the direction, in which the lateral surfaces 34 and 36 of roof section 32 join each other. This defines a concentration direction 56 on light exit surface 16, which is opposite to the 'longitudinal direction of the exit surface' 22 in the depicted example.

Figures 4, 5:
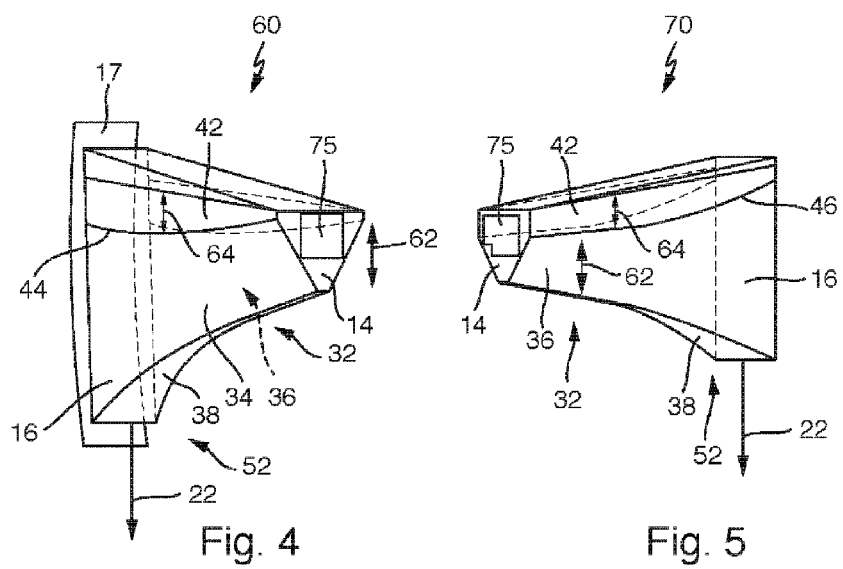
FIG. 4 shows a further embodiment of the light guiding element according to the invention.
FIG. 5 shows another embodiment of the light guiding element.

FIGS. 4 and 5 depict further embodiments 60 and 70 of the light guiding element according to the invention whereby different intensity curves can be achieved on light exit surface 16. Roof section 32 can be assigned a respective roof height 62, which is parallel to the 'longitudinal direction of the exit surface' 22, along which the roof-shaped lateral surfaces 34 and 36 extend. A certain light guiding height 64, which is parallel to the 'longitudinal direction of the exit surface' 22, can be defined for the light guiding surfaces 42, which run parallel to the 'longitudinal direction of the exit surface' 22. Roof height 62 and light guiding height 64 are defined by the course of the first and the second roof bordering edge 44 and 46, in which the vertical light guiding surfaces 42 connect to the roof-shaped first and second lateral surfaces 34 and 36.

The roof bordering edges 44 and 46 in light guiding element 60 according to FIG. 4 run in such a way, that light guiding height 64 continually increases (in particular, in a linear way) in its course along light guiding section 12 from light entrance surface 14 towards light exit surface 16 within the area of roof section 32. It is possible that a section with a constant light guiding height connects to it. In the area of roof section 32, roof height 62 is by far greater than light guiding height 64. In contrast to this, the roof bordering edges 44 and 46 in the depicted light guiding element 70 of FIG. 5 extend in such a way that the light guiding height 64 is mainly constant in the area of roof section 32 along its course from light entrance surface 14 towards light exit surface 16, but it continually decreases in its further course along the outlet section 52. In the area of roof section 32, roof height 62 is about double the size of light guiding height 64. The ratio of the roof-shaped lateral surfaces 34, 36 to the light guiding surfaces 42 determines, how large the portion of light will be, that will be directed away from roof section 32, as described in greater detail below.

In FIGS. 4 and 5, the respective outline of a light emitting surface 75 of an semiconductor light source (for example, an LED-chip) is indicated within the area of light entrance surface 14. In FIG. 4, light emitting surface 75 has a square shape. Light entrance surface 14 of light guiding element 60, however, has a substantially hexagonal shape, similar to the one explained in FIG. 2 (but with comparatively shorter leading edges 25 and longer pointed edges 26 and 28). In order to achieve a light coupling-in that is as complete as possible, light emitting surface 75 and light entrance surface 14 have to overlap as much as possible. Due to the difference in shape of light emitting surface 75 and light entrance surface 14, as is the case with light guiding element 60, it is sufficient to align the edges of the two surfaces 14 and 75, which run perpendicular to the 'longitudinal direction of the exit surface' 22, towards each other (which means the base edge 24 of light entrance surface 14 and a bordering edge of light emitting surface 75, which runs perpendicular to the 'longitudinal direction of the exit surface' 22). The positioning is less critical with regard to a displacement that is perpendicular to the 'longitudinal direction of the exit surface' 22, because if there is only a minor positioning inaccuracy then only the corners of light emitting surface 75 extend beyond the pointed edges 26 or 28 of light entrance surface 14 such that only a small portion of the emitted light amount is lost.

In FIG. 5, light emitting surface 75 has a shape which can be derived from the described shape in FIG. 4 in that a small and basically square section is cut out of a corner of light emitting surface 75. For example, this may be necessary for an LED-chip in order to create a bond-pad for contacting the LED.

Figure 6:
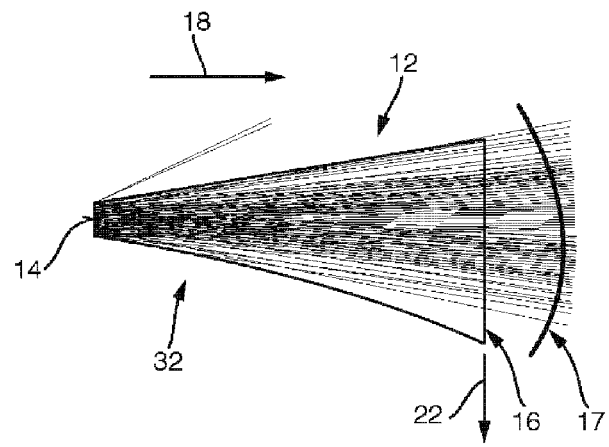
FIG. 6 shows an illustrative sketch to describe the optical path.

FIGS. 6 to 9 depict the effects of the measures on the intensity distribution of the light that was coupled-out through light exit surface 16, as discussed above. FIG. 6 thus sketches the paths of the rays of light throughout light guiding section 12, which are coupled-in through light entrance surface 14 and which exit through light exit surface 16, in a longitudinal section along the main light guiding direction 18. Total internal reflection at the lateral surfaces of roof section 32 leads to a direction component which is opposite to roof section 32. This leads to a light concentration on light exit surface 16 within the direction opposite of roof section 32.

Figure 7:
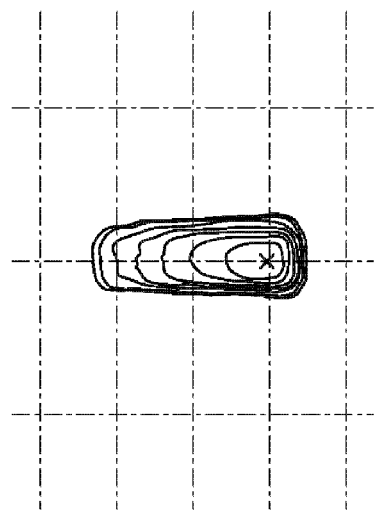
FIG. 7 shows a light intensity profile of a projection as it appears on the light exit surface on a test screen.

If the light intensity that is coupled-out through light exit surface 16 is viewed on a test screen set up at a distance within the main light guiding direction 18, parallel to light exit surface 16, then the sketched depiction shown in FIG. 7 will appear (depiction of light intensity via ISO-intensity lines). Starting from an intensity maximum in the concentration area of light exit surface 16, the light intensity decreases continually in the 'longitudinal direction of the exit surface' 22. Since the light path from light entrance surface 14 towards light exit surface 16 is not fully blocked out by roof section 32, a certain proportion of the light rays reach into the area of light exit surface 16, which is located opposite to the previously mentioned concentration area. The greater the proportion of the roof-shaped lateral surfaces 34 and 36, which are confining light guiding section 12, when compared to the lateral surfaces (for example, guiding surface 42) which run parallel to the 'longitudinal direction of the exit surface' 22, the greater the proportion of the light that is being directed into the concentration area opposite of roof section 32.

Furthermore, the proportion of the light that is being directed into the concentration area increases the more, the further roof section 32 expands into the direction starting from light entrance surface 14 towards light exit surface 16. The proportion of the light that is being directed into the concentration area increases, the greater the ratio of the length of roof section 32 to the length of the outlet section 52, along the main light guiding direction 18 will be.

Figure 8:
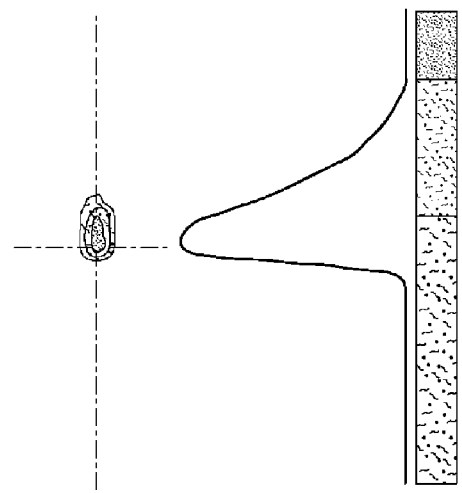
FIG. 8 shows a light intensity profile for a type of light guiding element according to the invention.
Figure 9:
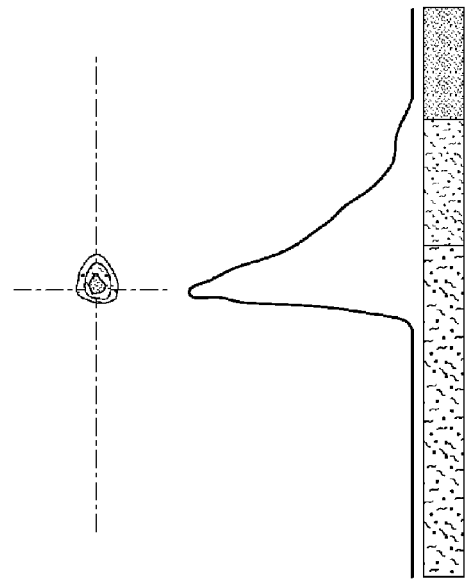
FIG. 9 shows a light intensity profile for a further type of light guiding element according to the invention.

FIGS. 8 and 9 contrast the intensity curves for different embodiments of the light guiding element (on the left, a respective depiction of the intensity curve on a test screen set up at some distance to light exit surface 16, and on the right side of the Figures, a vertical cut through the intensity distribution along the 'longitudinal direction of the exit surface' 22). The intensity distributions depicted in FIGS. 8 and 9 were achieved with light guiding elements according to the invention in that the intensity distribution that was appearing on light exit surface 16 was projected onto a test screen via a secondary optics (for example, a converging lens). Therefore, the depictions are upside down and mirror-inverted when compared to FIG. 7.

An intensity profile in the kind of FIG. 8 results from a light guiding element; for example, where ratio of roof height 62 to light guiding height 64 is small and/or where the ratio of the longitudinal expansion of roof sections 32 to outlet section 52 along the main light guiding direction 18 is small and/or where the lateral surfaces 34 and 36 of light guiding section 12 diverge intensely in a funnel-shaped manner in their course starting from light entrance surface 14 towards light exit surface 16. The effect of these embodiments is that a larger proportion of the light rays passes through light guiding section 12 without being totally internally reflected on the lateral surfaces of roof section 32. Thus, the light concentration is less distinctive. In contrast to this, FIG. 9 depicts an intensity profile for a light guiding element, in which roof height 62 is considerably larger than light guiding height 64 and/or where the longitudinal expansion of roof section 32 is large compared to the longitudinal expansion of outlet section 52 and/or where lateral surfaces 34 and 36 of light guiding section 12 only diverge slightly in a funnel-shaped manner. This leads to an intensity profile with a tightly limited intensity maximum and a basically exponential course. Light guiding element 60 according to FIG. 4 leads to an intensity profile that is rather similar to the one in FIG. 9, whereas light guiding element 70 more likely produces an intensity profile in the kind of FIG. 8.

In FIG. 10, a light guiding element 80 is described, which has a roof section 32 that is arranged in a tilted manner. This is being accomplished in that the first lateral surface 34 is set in an acute first approach angle $\alpha 1$ to the 'longitudinal direction of the exit surface' 22, and the second lateral surface 36 is set in an acute second (different from the first) approach angle $\alpha 2$ to the 'longitudinal direction of the exit surface' 22. The first approach angle $\alpha 1$ is smaller in size than the second approach angle $\alpha 2$. For better clarity, the shape of light entrance surface 12 is sketched in FIG. 10A, whereby the same reference signs were used for the bordering edges as in FIG. 2. The light entrance surface 14 is basically designed in the shape of a hexagon. But the first pointed edge 26 is set in a smaller first approach angle $\alpha 1$ to the 'longitudinal direction of the exit surface' 22, whereby the second pointed edge 28 is set in a larger second approach angle $\alpha 2$ to the 'longitudinal direction of the exit surface' 22. Unlike the before-mentioned light guiding elements 10, 60, 70, light guiding section 12 of light guiding element 80 is thus not arranged in a mirror-symmetrical way to a plane passing through the 'longitudinal direction of the exit surface' 22.

In FIGS. 11A and 11B, a light guiding element 90 is depicted, which is derived from a light guiding element according to FIG. 1 in that the light guiding section 12 is curved along a guiding line 92. This has the effect that, in its course starting from light entrance surface 14 towards light exit surface 16, the first lateral surface 34 is more intensely curved in a concave way than the second lateral surface 36. Thus, light guiding section 12 diverges in the manner of an asymmetrical funnel.

The embodiments depicted in FIGS. 10, 11A, and 11B produce the effect that the intensity maximum on the light exit surface is displaced in the direction perpendicular to the 'longitudinal direction of the exit surface' 22. It is thus possible to specifically produce asymmetrical light distributions or to compensate displacements of the light focus. It can also be advantageous if the shape of light exit surface 16 can be modified via a distortion of the pure rectangular shape (compare FIG. 11). In this way it is possible that the edge, in which the 'plane opposite of the roof section' 40 and light exit surface 16 join each other (and to which the light concentration is forming), is no longer parallel to the intensity maximum that is appearing on light exit surface 16.

Figure 12:
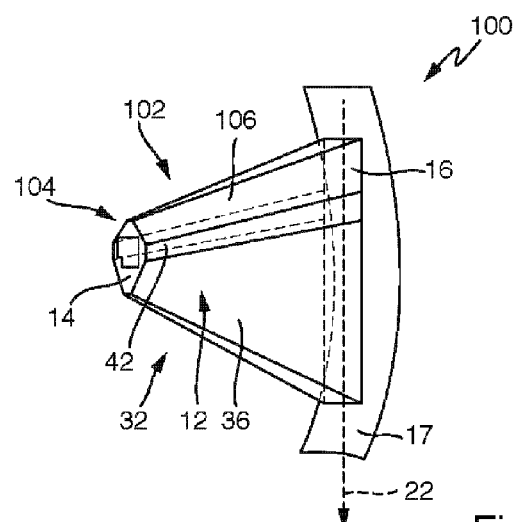
FIG. 12 shows another further embodiment of a light guiding element.

FIG. 12 depicts a light guiding element 100 in which light guiding section 12 is confined by two oppositely located roof sections 32 and 102, which both extend in the direction from light entrance surface 14 towards light exit surface 16. The roof sections 32 and 102 are positioned opposite of each other with reference to the expansion direction of light guiding section 12 from light entrance surface 14 towards light exit surface 16. The (first) roof section 32 hereby has a formation, as it is described for the FIGS. 1 and 2, for example. Instead of the 'plane opposite of the roof section' 40, light guiding section 12 includes a further roof section 102 (opposite roof section). In the area of the further roof section 102, light guiding section 12 has a third lateral surface 104 and a fourth lateral surface 106, which run towards each other with reference to the direction opposite to the 'longitudinal direction of the exit surface' 22. The first lateral surface 34 and the second lateral surface 36 of the first roof section 32 diverge into the direction of the further roof section 102. Similarly, the lateral surfaces 104 and 106 of the further roof section 102 diverge into the direction of the first roof section 32. Between the third lateral surface 104 and the first lateral surface 34, there is another light guiding surface 42, which expands parallel to the 'longitudinal direction of the exit surface' 22. Similarly, a light guiding surface 42 runs between the fourth lateral surface 106 and the second lateral surface 36. Light guiding surfaces 42 in turn connect to the respectively bordering roof-shaped lateral surfaces 104 or 34 as well as 106 or 36 at the roof bordering edges, which extend alongside light guiding section 12.

In light guiding element 100, the light rays that are guided within light guiding section 12 are not only directed into the direction opposite to the first roof section 32, but also into the direction opposite to the further roof section 102. Thus, an intensity profile is appearing on light exit surface 16 with a maximum within the area in which the light guiding surfaces 42 are connecting to light exit surface 16. Starting from this maximum, the intensity profile does not only fade-out into the 'longitudinal direction of the exit surface' 22, but also into the opposite direction of it in a continual way.

Figure 13:
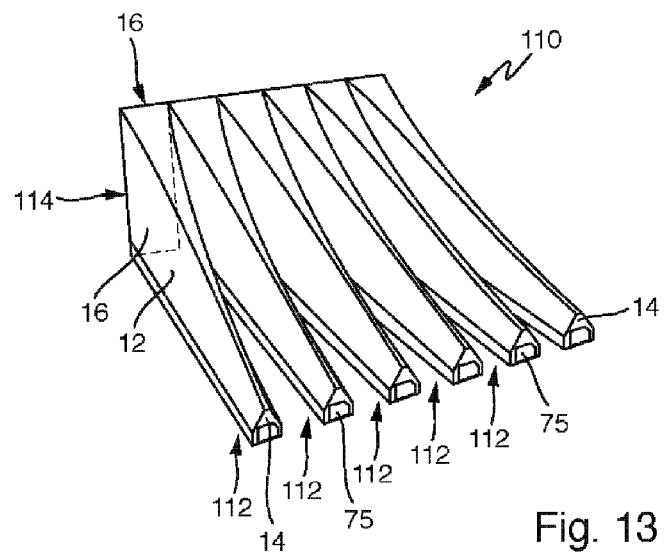
FIG. 13 shows a primary optics arrangement with light guiding elements.

The light guiding elements according to the invention can be used to build a primary optics 110 for a motor vehicle lighting device, as it is depicted in FIG. 13. Several light guiding elements 112 are hereby arranged in a matrix-like way. In the shown depiction they are arranged in a kind of a line matrix. Light guiding elements 112 can be constructed as described in the embodiments discussed above. The light guiding sections 12 of the individual light guiding elements 112, mainly extend parallel towards each other in the depicted example. The light exit surfaces 16 of the individual light guiding elements 112 are set directly next to each other so that a 'primary optics exit surface' 114 is formed, which includes all light exit surfaces 16 of the individual light guiding elements 112. It is also possible that a production-related gap is formed between the bordering light exit surfaces 16 (for example, within a range of 0.1 mm).

In the depicted example, primary optics exit surface 114 is basically plane. However, embodiments with a curved primary optics surface 114 are also possible (for example, a saddle-shaped). The individual light guiding sections 12 of the light guiding elements 112 are then set in a perpendicular way on the primary optics exit surface 114.

Starting from the primary optics exit surface 114, the light guiding sections 12 are extending in such a way, that their lateral walls do not touch each other. A touching of neighboring light guiding sections 12 within the area of their lateral walls can have a negative impact on the light guiding via total internal reflection. Primary optics 14, which is made out of the light guiding elements 112, includes a corresponding number of light entrance surfaces 14, which are also arranged in a matrix-like way (in a kind of a line matrix). Light can be coupled-into primary optics 110 through these light entrance surfaces 14 via semiconductor light sources, which are correspondingly arranged in a matrix-like way.

Figure 14:
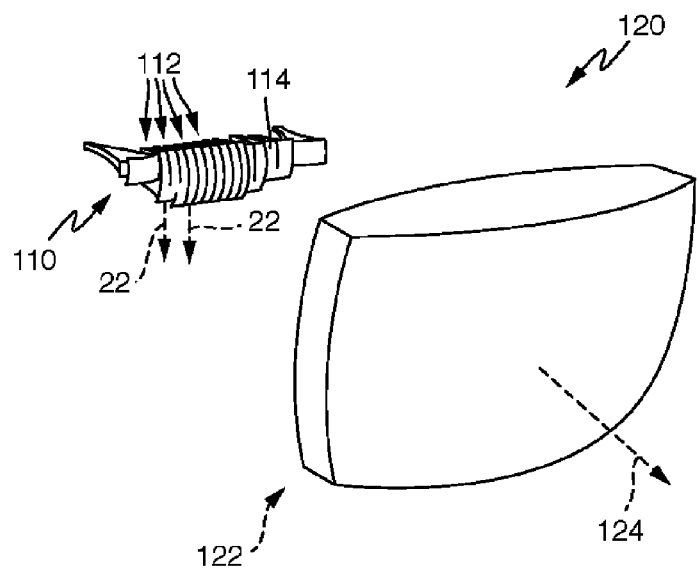
FIG. 14 shows a sketch of a light module according to the invention.

FIG. 14 illustrates the construction of a light module 120, which includes a primary optics 110 and a secondary optics 122. Primary optics 110 in turn, is constructed by a number of light guiding elements 112, whereby the individual light guiding elements 112 are different in their form in the depicted example. Secondary optics 112 is shaped in such a way that the light distribution appearing on primary optics exit surface 114 can be projected into a light emission distribution (for example: converging lens, cylindrical lens). For further development, the secondary optics can include dispersing structures with which is possible to soften the contours of the intensity distributions that are appearing on the light exit surfaces 16 in order to achieve a light emission distribution with a continual intensity course. It can further be advantageous if secondary optics 122 includes a color-correcting optical element (for example, an achromatic lens).

Figure 15:
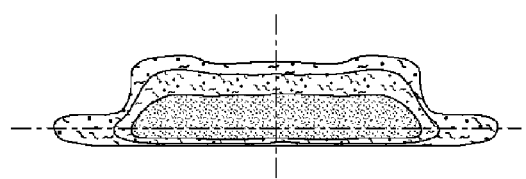
FIG. 15 shows an intensity curve of the distribution of the emitted light of the light module of FIG. 14.

FIG. 15 depicts the intensity profile which can be observed when secondary optics 122 projects the light emission distribution onto a test screen set up within the 'main direction of the emitted light' 124 of light module 120. The intensity profile has an intensity maximum which is extending horizontally along a cut-off line. Starting from its intensity maximum, the intensity distribution continually fades out in the direction towards the vertical top. With a suitable choice of light guiding elements 112, which are arranged in a matrix-like way, it is possible to produce a desired light distribution already on primary optics exit surface 114, which will be then be projected into the light emission distribution via secondary optics 122.

At primary optics 110, several light guiding elements 112 are arranged next to each other in a matrix-like way, whereby the light exit surfaces 16 of the individual light guiding elements 112 differ in their vertical expansion along their respective 'longitudinal direction of the exit surface' 22. The light guiding elements 112 in primary optics 110 are hereby arranged in such a way, that the intensity maxima, which are appearing on the light exit surfaces 16, complement each other to form a horizontal intensity maximum along a cut-off line in FIG. 15.

An essential aspect of the present invention is the geometrical difference in the shape of light entrance surface 14 and light exit surface 16. It is possible to shape the roof section 32 which directly connects to light entrance surface 14 in an advantageous way with suitable combinations of different forms. FIGS. 16 to 31 illustrate advantageous form-combinations for light entrance surface 14 and light exit surface 16. Light exit surface 16 is made in the shape of a rectangle, wherein the height alongside the 'longitudinal direction of the exit surface' 22 is more than double the size of its width perpendicular to the 'longitudinal direction of the exit surface' 22. Other elongated or strip-like formations of light exit surface 16 are also possible. In the depictions according to FIGS. 16 to 31, dotted lines are indicated between light entrance surface 14 and light exit surface 16. These do not necessarily mean that they are edges, but they rather illustrate the shape transition from light entrance surface 14 to light exit surface 16.

In FIG. 16, light entrance surface 14 has a pentagonal shape, wherein only two of the bordering edges are set in an acute angle. The roof section can start to extend from these acute angles. In FIG. 16, light entrance surface 14 is depicted in two different orientations, which originate from each other via a 180° rotation. It is also possible that light entrance surface 14 in the illustrated light guiding elements can be arranged in such a way, that their particular alignment is rotated by 180°.

FIG. 17 depicts a hexagonal light entrance surface 14 that has two oppositely located corners in which the edges join each other in an acute angle. Such a light entrance surface is suitable for light guiding elements with two oppositely located roof sections (for example, as illustrated in FIG. 12).

FIG. 18 depicts a triangular light entrance surface 14, and FIG. 19 depicts a trapezoidal light entrance surface 14. The roof ridge surface 38 of the roof section can be connected to this short side of the trapezoid.

Figure 20:
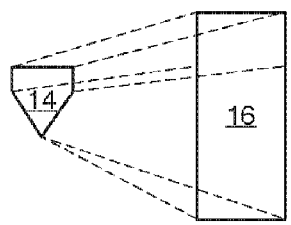
Figure 21:
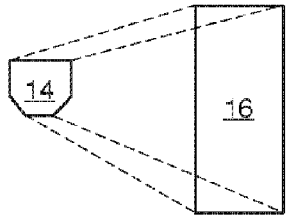
Figure 22:
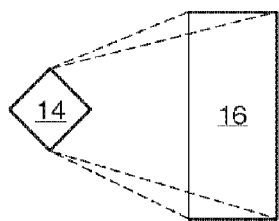
Figure 23:
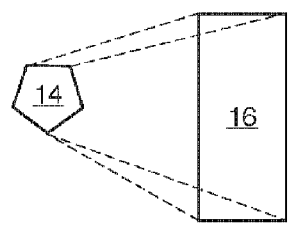
Figure 24:
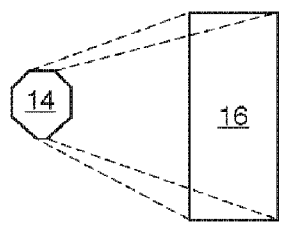

FIG. 21 depicts a hexagonal light entrance surface 14 (compare FIG. 1) and is derived from the depicted pentagonal light entrance surface 14 of FIG. 20 by cutting off of its tip, in which the bordering edges join each other in an acute angle. FIG. 22 depicts a rhombus-shaped light entrance surface 14. FIG. 23 depicts a light entrance surface 14, which is designed as a regular pentagon. An octagonal design of light entrance surface 14 (compare FIG. 24) is also possible.

Figure 25:
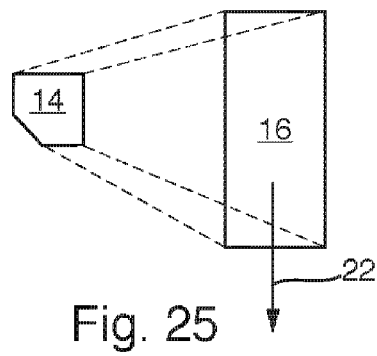
Figure 26:
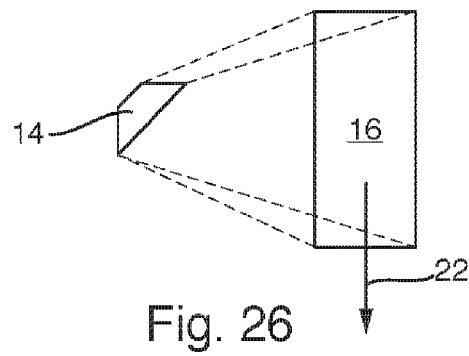
Figure 27:
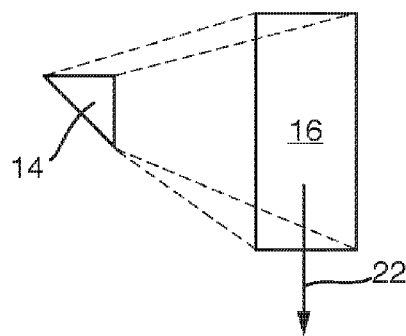
Figure 28:
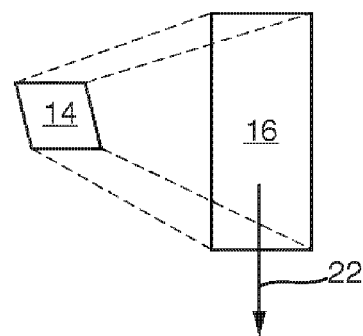

FIGS. 25 to 28 depict light entrance surfaces 14, which are arranged asymmetrical with regards to the 'longitudinal direction of the exit surface' 22. In FIG. 25, the light entrance surface is pentagonal, in the shape of a square with a cut-off corner. FIG. 26 depicts an asymmetrical trapezoid as light entrance surface 14. The light entrance surface in FIG. 27 is designed as a right angled, isosceles triangle, in which the hypotenuse is set at an angle of 45° to the 'longitudinal direction of the exit surface' 22. FIG. 28 depicts a light entrance surface 14 which is designed in the shape of a diamond. A parallelogram is also possible.

Light entrance surface 14 can also be designed with only one corner and a circular arc, as it is depicted in FIG. 29. A drop-shaped cross section is also possible. Another option is a design in the shape of a polygon with rounded corners, e.g. a rectangle with rounded corners (compare FIG. 30).

FIG. 31 depicts a light entrance surface 14 in the shape of a segment of a circle.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A light guiding element for motor vehicle lighting devices, having a light guiding section extending between a light entrance surface for coupling-in light and a light exit surface for coupling-out light from the light guiding element through the light exit surface, wherein the light exit surface has an elongated shape and extends in a longitudinal direction, and wherein the light guiding section has at least a first and a second lateral surface extending from the light entrance surface towards the light exit surface such that light can be guided by total internal reflection from the light entrance surface towards the light exit surface; wherein the form of the light entrance surface differs from that of the light exit surface; wherein the light exit surface has a longitudinal expansion in the longitudinal direction of the exit surface and a transverse expansion perpendicular to the longitudinal direction of the exit surface, whereby the longitudinal expansion is larger than the transverse expansion; and wherein the light guiding section has a roof section extending directly from the light entrance surface into the direction of the light exit surface, in which the first and the second lateral surfaces of said roof section are inclined with respect to the longitudinal direction of the exit surface and converge to form a roof-shaped spine of the light guiding section, which extends from the light entrance surface into the direction of the light exit surface, wherein the light guiding section is confined by a roof ridge surface in the direction along which the lateral surfaces of the roof section converge, wherein the roof ridge surface runs between and directly borders the first and the second lateral surface such that, in a cross-section parallel to the light exit surface, the light guiding section has a bordering edge, which is perpendicular to the longitudinal direction of the exit surface, and wherein the roof ridge surface is curved in a concave way along its course starting from the light entrance surface towards the light exit surface.

2. The light guiding element as set forth in claim 1, wherein the light guiding section is confined by at least one further light guiding surface, which extends in the direction from the light entrance surface towards the light exit surface and which is directly bordering to one of the lateral surfaces of the roof section, whereby the light guiding surface extends parallel to the longitudinal direction of the exit surface.

3. The light guiding element as set forth in claim 1, wherein the roof ridge surface has a lateral expansion perpendicular to its extension direction from the light entrance surface towards the light exit surface, which increases in the course of the roof ridge surface from the light entrance surface towards the light exit surface.

4. The light guiding element as set forth in claim 1, wherein the first lateral surface of the roof section is set in an acute first approach angle and the second lateral surface is set in an acute second approach angle to the longitudinal direction of the exit surface, whereby the first approach angle and the second approach angle differ in size.

5. The light guiding element as set forth in claim 1, wherein in the direction opposite to the roof section, the light guiding section is confined by a plane opposite of the roof section, which extends between the light entrance surface and the light exit surface in a plane manner.

6. A light module for motor vehicle head lights comprising a matrix arrangement of semiconductor light sources for emitting light, a primary optics and a secondary optics; wherein the primary optics includes light guiding elements as set forth in claim 1 arranged in a matrix, which feature a respective light entrance surface and a light exit surface, whereby one respective light entrance surface is assigned to one of the semiconductor light sources and the light exit surfaces of the light guiding elements are arranged in a matrix and form a primary optics exit surface; and wherein the secondary optics is arranged in such a way that the light distribution, produced by the light module, which appears on the primary optics exit surface, is projected onto an area in front of the head light or of the light module, in order to accomplish a desired distribution of the emitted light.

7. The light module as set forth in claim 6, wherein the semiconductor light source includes a light emitting surface for emitting light, whereby the light emitting surface is different in shape from the respectively assigned light entrance surface.

8. The light guiding element as set forth in claim 1, wherein the longitudinal expansion is at least double the size of the transverse expansion.

\* \* \* \* \*